(12) United States Patent
Shah et al.

(10) Patent No.: US 11,006,278 B2
(45) Date of Patent: May 11, 2021

(54) MANAGING NETWORK RESOURCE PERMISSIONS FOR APPLICATIONS USING AN APPLICATION CATALOG

(71) Applicant: AirWatch LLC, Atlanta, GA (US)

(72) Inventors: Sulay Shah, Atlanta, GA (US); Noah Wasmer, Palo Alto, CA (US)

(73) Assignee: AirWatch LLC, Atlanta, GA (US)

( * ) Notice: Subject to any disclaimer, the term of this patent is extended or adjusted under 35 U.S.C. 154(b) by 1234 days.

(21) Appl. No.: 14/946,065

(22) Filed: Nov. 19, 2015

(65) Prior Publication Data
US 2017/0147157 A1 May 25, 2017

(51) Int. Cl.
| | | |
|---|---|---|
| *H04W 12/37* | (2021.01) | |
| *H04W 12/08* | (2021.01) | |
| *H04L 29/06* | (2006.01) | |
| *G06F 8/60* | (2018.01) | |

(52) U.S. Cl.
CPC .............. *H04W 12/37* (2021.01); *G06F 8/60* (2013.01); *H04L 63/104* (2013.01); *H04W 12/08* (2013.01)

(58) Field of Classification Search
CPC ..... H04L 41/22; H04L 41/12; H04L 12/2602; H04L 63/104; H04W 12/37; H04W 12/08; G06F 8/60
USPC ........................................................ 715/736
See application file for complete search history.

(56) References Cited

U.S. PATENT DOCUMENTS

| | | | | |
|---|---|---|---|---|
| 7,874,008 | B2* | 1/2011 | Chang | G06F 12/1458 726/1 |
| 9,280,377 | B2* | 3/2016 | Lang | G06F 9/4555 |
| 9,369,449 | B2* | 6/2016 | Batson | H04L 67/10 |
| 2005/0172149 | A1* | 8/2005 | Xu | G06F 21/6218 726/22 |
| 2008/0263543 | A1* | 10/2008 | Ramachandran | G06F 8/61 717/177 |
| 2009/0204711 | A1* | 8/2009 | Binyamin | H04L 67/16 709/226 |
| 2010/0242037 | A1* | 9/2010 | Xie | G06F 8/61 717/178 |
| 2012/0036440 | A1* | 2/2012 | Dare | G06F 9/4445 715/734 |
| 2014/0108649 | A1* | 4/2014 | Barton | G06F 9/45533 709/224 |
| 2016/0132214 | A1* | 5/2016 | Koushik | G06F 3/04842 715/741 |

* cited by examiner

*Primary Examiner* — Tadesse Hailu
(74) *Attorney, Agent, or Firm* — Thomas | Horstemeyer, LLP

(57) ABSTRACT

Disclosed are various examples for managing network resource permissions for applications through the use of an application catalog. A user interface presenting an application catalog is generated that includes a listing of applications that are available to managed client devices in an organization. A selection of a particular application from the application catalog is received from a managed client device. The selection indicates a particular security group of multiple security groups. A network of the organization is configured to provide the particular application on the managed client device with access to a set of resources corresponding to the particular security group.

20 Claims, 7 Drawing Sheets

MANAGING NETWORK RESOURCE PERMISSIONS FOR APPLICATIONS USING AN APPLICATION CATALOG

BACKGROUND

Most users are now familiar with the concept of an application catalog, which can be referred to as an "app store." When users wish to install an application, their first thought is to access a program or web site corresponding to an "app store." An application catalog is a centralized interface through which users can browse information about various applications and easily launch downloads and installations of selected applications. Application catalogs are typically administered by a single organization, which can establish rules and security procedures to be followed in order for developers to participate. This central administration can provide a level of trustworthiness and comfort for users who are installing applications. In many cases, application catalogs are integrated with a shared payment workflow of the administering organization to simplify payments for applications. While popularized beginning with smartphones and tablets, application catalogs are increasingly relied upon for distributing applications for desktop and laptop computers as well.

In addition to the familiar application catalogs that are made available to the general public, organizations can provide private application catalogs for their employees or members. For example, an organization can choose to include only applications that have met security screening guidelines for use within the computer network of the organization. The application catalog can also manage application licensing for the organization. Rather than the user paying for a specific download of an application as is the case with public application catalogs, a private application catalog can track installations to comply with site licensing requirements or other previously negotiated licensing contracts. Such private application catalogs can be made available for devices managed through mobile device management (MDM). Such devices can be owned by the organization or the users themselves in a bring-your-own-device (BYOD) environment.

One issue with allowing a user to download an application from a private application catalog is that a user typically receives access to all resources on the network. For example, a large corporation can include multiple sales organizations focused on different products or geographic regions. The corporation can provide a sales application to its sales employees to track sales for their product or region. However, all of the sales employees who download the application typically would receive access to all sales documents regardless of that particular user's responsibilities, which can expose sensitive corporation information throughout the organization. Traditional approaches to restricting access, such as an administrator setting permissions for every user on every document or creating different custom applications for each corporate group, cannot scale to organizations with many employees and large numbers of documents and resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
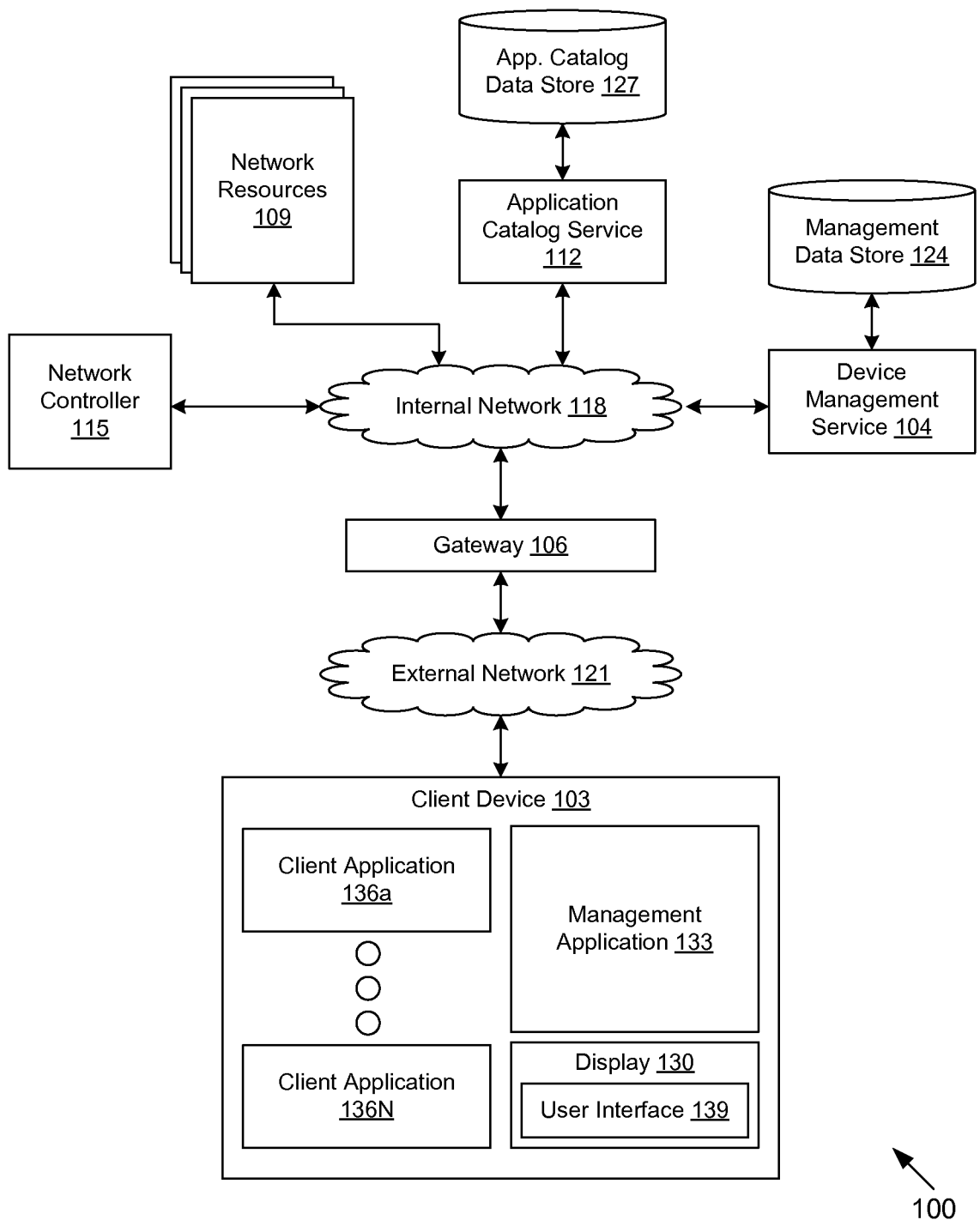
FIG. 1 is a drawing of a networked environment according to various examples of the disclosure.

The present disclosure relates to managing network resource permissions for applications through the use of an application catalog. Application catalogs are typically employed by users to locate applications, and once located, users can purchase, download, and install the applications through a simplified interface. For example, a user can select an application category or enter a search query in a user interface of the application catalog, and a listing of applications can be populated in the user interface. The listing of applications can be as simple as a set of application icons, and selecting an application icon can cause the corresponding application to be installed on that device. As will be described, the usual functionality of an application catalog can be augmented to manage permissions for network resources as well.

Suppose that an enterprise has three exemplary databases: financial records, customer communications, and supplier communications. Most users in the organization have specific limited roles and will not need to access all three databases. Users in an accounting department access the financial records database, but not the customer or supplier communications databases. Customer service representatives access the customer communications database, but not the supplier communications or the financial records databases. Conversely, purchasing agents access the supplier communications database but not the customer communications or financial records database. Executive-level employees can have a legitimate need to access any of the databases.

For security reasons, it would be best to limit authorization to the various databases to users who have a legitimate need to access the data to fulfill their organizational role. Thus, if a customer service representative maliciously attempts to access the financial records database, the access will be denied. This provides security not only in the case of a disgruntled employee but also in situations where the device of the employee has been compromised and is under control of another user.

In various examples of the present disclosure, an application catalog permits users to indicate types of network resources that they will need to access in order to perform their roles in the organization. Continuing with the previous example, a document viewer application can be listed multiple times in the application catalog, e.g., for executives, accounting, customer service, and purchasing. The various instances of an application can correspond to organizational roles or otherwise groupings of specific network resources (e.g., databases, web sites, etc.). Selection of a corresponding instance causes the document viewer application to be configured with permissions to access network resources associated with the particular organizational role. Alternatively, a single instance of the application can be shown in the application catalog, with a user interface component that allows the user to select a role or resource grouping.

In some implementations, network microsegmentation can be used to manage the selected access for a given application. A microsegment can correspond to a virtual network where resource permissions are enforced by adding a resource to the microsegment or removing a resource from the microsegment. For example, a spreadsheet containing last quarter's sales data for the organization can be included in a microsegment accessible by management users but not in a microsegment accessible by customer service users. The microsegment security model either replaces or functions in concert with security models that manage access at each resource. A separate network microsegment can be created for at least every grouping of network resources that are to be accessed.

With reference to FIG. 1, shown is a networked environment 100 according to various examples. The networked environment 100 includes a client device 103, a device management service 104, a gateway 106, a plurality of network resources 109, an application catalog service 112, a network controller 115, an internal network 118, and an external network 121. The gateway 106, the device management service 104, the application catalog service 112, the network resources 109, and the network controller 115 can be coupled to the internal network 118, while the gateway 106 and the client device 103 can be coupled to the external network 121. Each of the internal network 118 and the external network 121 can include, for example, wide area networks (WANs), local area networks (LANs), wired networks, wireless networks, other suitable networks, or any combination of two or more networks. For example, the networks can include satellite networks, cable networks, Ethernet networks, and other types of networks.

The device management service 104, the gateway 106, the network resources 109, the application catalog service 112, and the network controller 115, can include, for example, a server computer, a network device, or any other system providing computing capabilities. Alternatively, the device management service 104, the gateway 106, the network resources 109, the application catalog service 112, and the network controller 115 can employ multiple computing devices that can be arranged, for example, in one or more server banks, computer banks, or other arrangements. The computing devices can be located in a single installation or can be distributed among many different geographical locations. For example, the device management service 104, the gateway 106, the network resources 109, the application catalog service 112, and the network controller 115 can include multiple computing devices that together form a hosted computing resource, a grid computing resource, or any other distributed computing arrangement.

In some cases, the device management service 104, the gateway 106, the network resources 109, the application catalog service 112, and the network controller 115 can operate as at least a portion of an elastic computing resource where the allotted capacity of processing, network, storage, or other computing-related resources can vary over time. The device management service 104, the gateway 106, the network resources 109, the application catalog service 112, and the network controller 115 can also include or be operated as one or more virtualized computer instances. Generally, the device management service 104, the gateway 106, the network resources 109, the application catalog service 112, and the network controller 115 can be operated in accordance with particular security protocols such that they are considered trusted computing environments. The device management service 104, the gateway 106, the network resources 109, the application catalog service 112, and the network controller 115 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104. Although managed client devices 103 on enterprise networks are discussed herein, it is understood that the principles of the present disclosure can also apply to unmanaged client devices 103, including unmanaged client devices 103 connecting to network resources 109 on the Internet.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through the secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 124 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 124 can also include user account data. User account data can include information with which a user account can be authenticated, such as user credentials. User account data can also include data such as email, contact, calendar data, documents, files or other data that is associated with a user account.

Device data can represent data stored in the management data store 124 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The gateway 106 establishes network tunnels with client devices 103 through the external network 121 in order to provide the client devices 103 with a secure connection to the network resources 109 coupled to the internal network 118. In other words, the gateway 106 restricts the access of the client device 103 to devices coupled to the internal network 118 by requiring the client device 103 to first establish a secure tunnel with the gateway 106. A tunnel uses a tunnel header to encapsulate the packets from one type of protocol in the datagram of a different protocol. Tunnels in some examples use point-to-point tunneling protocol (PPTP) to encapsulate internet protocol (IP) packets over a public network, such as the Internet. A tunnel encrypts the payload of its packets with one or more keys or secure certificates. This allows packets to be exchanged between the client device 103 and the gateway 106 securely. In some examples, the gateway 106 (1) encapsulates and encrypts packets sent from the internal network 118 to the client device 103 with a tunnel packet header, and (2) decapsulates tunnel headers from the packets that it receives from the client device 103, and decrypts these packets, before forwarding the packets to network elements of the internal network 118.

When a client device 103 tries to establish a tunnel connection with the gateway 106, the gateway 106 in some examples passes the credential set that it gets from the client device 103 to the device management service 104 in order to authenticate the request. In authenticating the credential set, the device management service 104 in some examples provides one or more mobile device management (MDM) attributes for the client device 103, the user (of the client device 103), and/or the application (executing on the client device 103) requesting the connection.

The gateway 106 associates the provided MDM attribute(s) with the data messages that it subsequently received from the client device 103 through the established connection. Also, once the connection is established, the client device 103 embeds one or more MDM attributes for the data messages that it sends in the tunnel header in some embodiments. In some examples, the gateway 106 aggregates the MDM attributes that it receives from the device management service 104 and the mobile device into one set of MDM attributes that it associates with the data messages transmitted by the client device 103 through its connection.

Based on the associated MDM attribute set, the gateway 106 performs one or more operations on the data messages that it receives from the client device 103 through the tunnel. The associated MDM attribute set provides the context for processing the data processing rules that the gateway 106 enforces in some examples. In some examples, the rule identifiers of the rules are not only defined by reference to MDM attribute values but also by the flow identifier values (e.g., the L2-L4 header values) of the data message flows.

The network resources 109 provide corresponding services for client applications. The services can include, for example, social networking services, email services, voice communication services, enterprise information management services, productivity services, game services, databases, and other services. The network resources 109 can communicate with the client device 103 over the external network 121 and the internal network 118 by way of hypertext transfer protocol (HTTP), simple object access protocol (SOAP), representational state transfer (REST), and/or other protocols.

The application catalog service 112 is executed to provide application catalog functionality to client devices 103. In particular, the application catalog service 112 is configured to generate a listing of applications that are available to be deployed (e.g., installed, configured) to client devices 103 that are managed by the organization. In this regard, the application catalog service 112 can encode one or more user interfaces that present the application catalog for rendering on the client device 103. Data relating to these user interfaces can be transferred to the client device 103 over the external network 121. For example, the data can correspond to a hypertext markup language (HTML) code, images, extensible markup language (XML) code, JavaScript object notation (JSON) data, yet another markup language (YAML) data, or other user interface data.

The application catalog service 112 can be aware of distinct security groups within the organization. Security groups can allow access to particular subsets of network resources 109 while denying access to other network resources 109. The security groups can, for example, correspond to roles of a user within the organization. When presenting applications that are available for deployment in the application catalog, options can be provided for a user to select a particular security group for a specific application deployment. When the application is deployed on the client device 103, the application is able to access network resources 109 in the selected or specified security group, but not other network resources 109 of the internal network 118. In another example, the system can automatically detect a user's security group based on information identifying the user or the user's device. For example, the MDM attributes used when accessing an application catalog can also be used to look up a user's assigned security group within the management data store 124. In one scenario, multiple instances of a particular application can be featured in a listing of applications in the application catalog, where each of the instances can correspond to a different security group.

The data stored in the application catalog data store 127 and available to the application catalog service 112 includes application packages for deployment to the client devices 103, configuration data that indicates the available security groups (or roles within the organizations) on a per-application basis, and potentially other data.

The network controller 115 is executed to control the gateway 106 and elements within the internal network 118 (e.g., firewalls, routers, bridges, intrusion detection systems, network address translation systems, port address translation systems) in order to implement virtual network segments within the internal network 118 for applications of the client device 103 to access a particular set of network resources 109. A virtual network segment, or microsegment, can be established for each set of network resources 109 such that network traffic from a client device 103 is routable in the internal network 118 only to an approved set of network resources 109 and not to other network resources 109. A given network resource 109 can accessible through a plurality of different virtual network segments.

Figure 2:
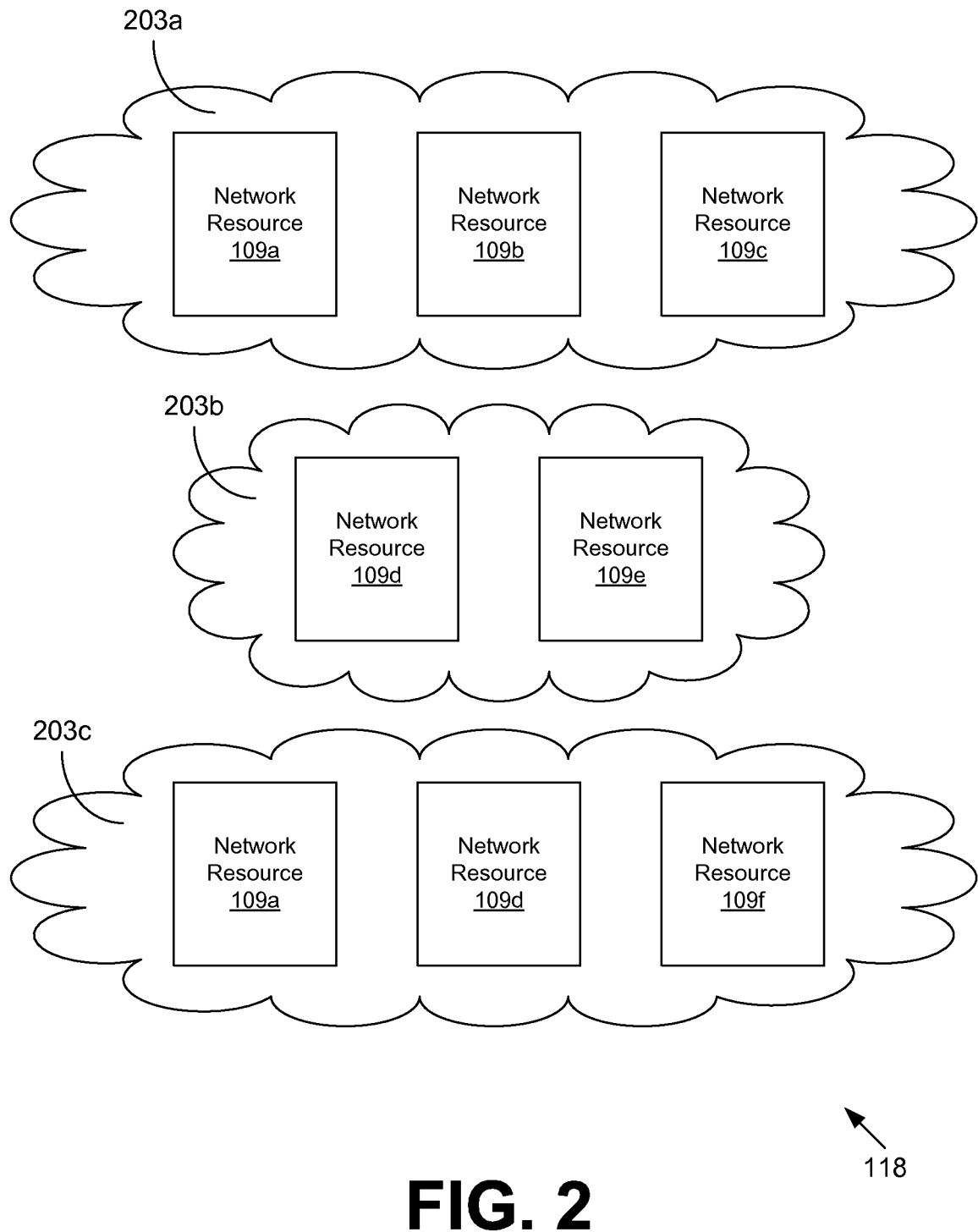
FIG. 2 is a drawing of an example of an internal network with multiple virtual network segments, which can each be associated with different security groups.

Referring now to FIG. 2, shown is one example of an internal network 118 with multiple virtual network segments 203a, 203b, 203c, which can each be associated with different security groups. In this example, the virtual network segment 203a includes network resource 109a, network resource 109b, and network resource 109c. Virtual network segment 203b includes network resources 109d and 109e. Virtual network segment 203c includes network resources 109a, 109d, and 109f. It is noted that the network resource 109a is accessible through multiple virtual network segments 203a and 203c. Similarly, the network resource 109d is accessible through virtual network segments 203b and 203c. This illustrates that a different combination of resources can be made available through individual virtual network segments 203. Examples of network resources 109 can include links to file repositories or portions thereof, particular servers, particular accounts on a server, particular virtual machines or particular data stored by a virtual machine, and particular computing devices.

Referring back to FIG. 1, the client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 130 that includes, for example, one or more devices such as liquid crystal display (LCD) displays or other types of display devices. The client device 103 can also be equipped with networking capability or networking interfaces, including a localized networking or communication capability such as a near-field communication (NFC) capability, radio-frequency identifier (RFID) read and/or write capability, a microphone and/or speaker, or other localized communication capability.

The client device 103 can execute various applications, such as a management application 133, a plurality of client applications 136a . . . 136N, and other applications, services, or processes. The management application 133 can receive security credentials from a user and authenticate with the device management service 104. Although described as an application, it is understood that the management application 133 can be an integral component of an operating system of the client device 103. The client applications 136 correspond to a variety of applications that are employed to access services provided by the network resources 109. The client applications 136 can include a web view component, whereby the client applications 136 interact with the network resources 109 to obtain network content by way of hypertext transfer protocol (HTTP) requests and responses. Alternatively, the client applications 136 can communicate with the network resources 109 using user datagram protocol (UDP), real-time transport protocol (RTP), and/or other protocols. The client applications 136 and the management application 133 can individually render a respective user interface 139 upon the display 130.

Figure 3:
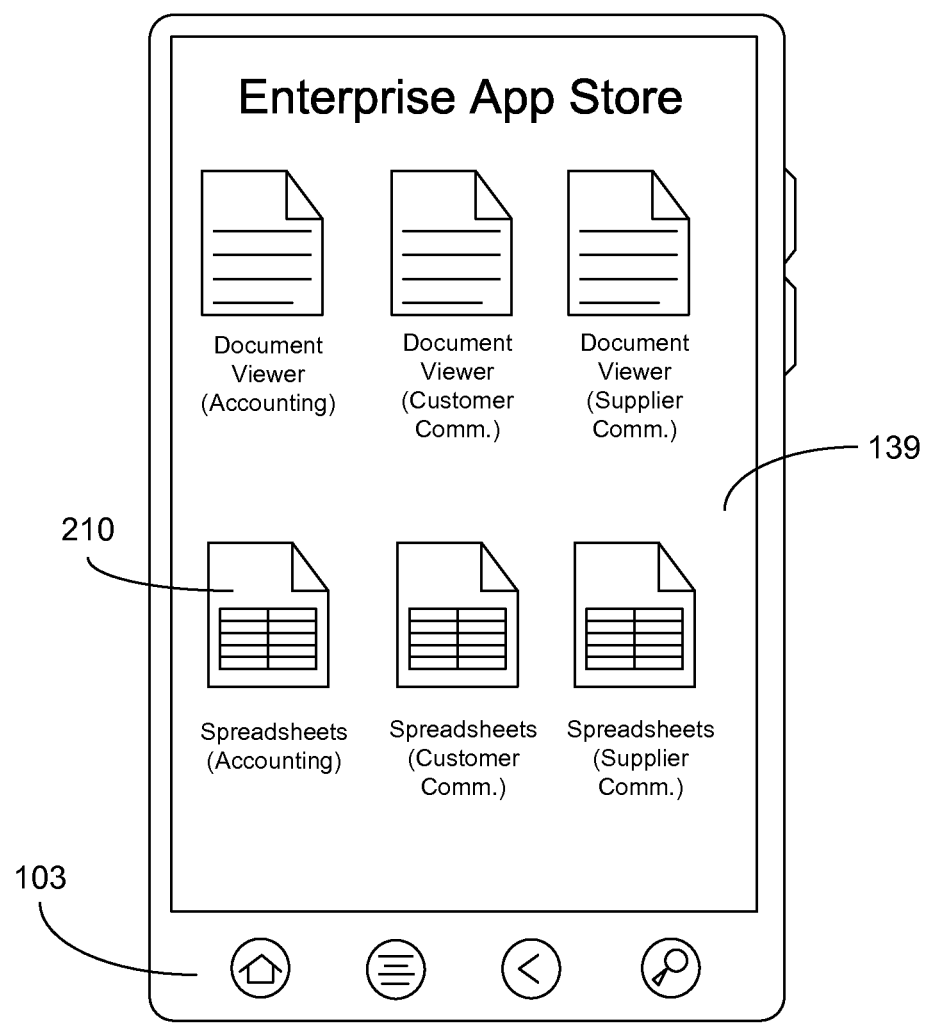
FIGS. 3 and 4 are drawings of example user interfaces rendered by a client device in the networked environment of FIG. 1.

Continuing now to FIG. 3, shown is one example of a user interface 139 rendered by a client device 103 in the networked environment 100 (FIG. 1). The user interface 139 corresponds to an application catalog interface for an enterprise. A plurality of indicia 210 (e.g., icons, labels, buttons) corresponding to client applications 136 (FIG. 1) in the application catalog are rendered in the user interface 139. Selecting any of the indicia 210 can cause a corresponding client application 136 to be downloaded from the application catalog data store 127 (FIG. 1) to the client device 103, where the client application 136 is then installed and configured. Alternatively, if the client application 136 is already installed on the client device 103, the client application 136 can be configured or reconfigured as will be described.

In this example, the indicia 210 that are shown correspond to two distinct client applications 136: a "document viewer" application and a "spreadsheets" application. However, each of these client applications 136 can utilize different collections of documents from different network resources 109 depending on what level of access is needed by the end user. For example, users can be grouped into various security groups (e.g., accounting, customer communications, supplier communications, executives) based on what network resources 109 they need to access to perform their respective assignments in the enterprise. Therefore, the application catalog can present what appear to be different versions of a client application 136 based on various business roles, but the same underlying client application 136 can be deployed regardless of which version a user selects. Through network segmentation, the network resources 109 that the user can then access can be limited based on the user's security group(s). This allows network resources 109 to be restricted to appropriate users without having to create multiple custom versions of a client application 136.

Upon selection of the indicia 210 correspond to "Spreadsheets (Accounting)," the "Spreadsheets" client application 136 will be deployed (if not already) to the client device 103 and configured to access a virtual network segment 203 (FIG. 1) that corresponds to the accounting security group. Likewise, upon selection of the indicia 210 correspond to "Spreadsheets (Customer Comm.)," the "Spreadsheets" client application 136 will be deployed (if not already) to the client device 103 and configured to access a virtual network segment 203 that corresponds to the customer communications security group. The configuration that occurs can include configuration on the client device 103 and/or configuration of the internal network 118 (FIG. 1) and gateway 106 (FIG. 1) by the network controller 115 (FIG. 1) to facilitate access of the client application 136 on the client device 103 to the network resources 109 in the corresponding virtual network segment 203. Upon receiving a request to download a particular client application 136, the device management service 104 can verify whether the requesting user should be granted access to the requested client application 136.

Figure 4:
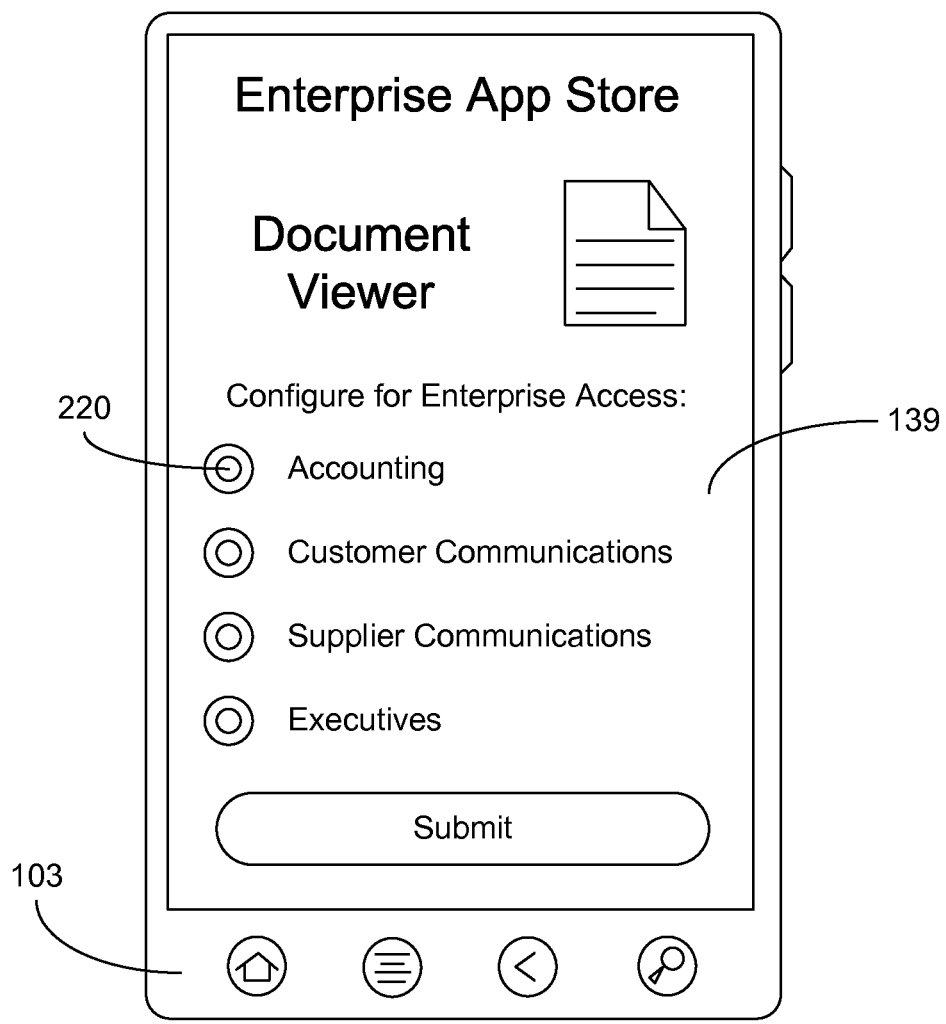

Turning to FIG. 4, shown is another example of a user interface 139 rendered by a client device 103 in the networked environment 100 (FIG. 1). The user interface 139 of FIG. 4 also corresponds to an application catalog user interface, but in this example, the user interface 139 corresponds to a particular selected client application 136, "Document Viewer." The user interface 139 includes a plurality of selectable components 220 (e.g., buttons, checkboxes, radio buttons, links) that correspond to a plurality of security groups (e.g., accounting, customer communications, supplier communications, executives). A user selection of a selectable component 220 associated with a particular security group causes the client application 136 to be configured for access to the network resources 109 (FIG. 1) and the virtual network segment 203 (FIG. 2) corresponding to the particular security group. The steps of selecting a security group and configuring the virtual network segment 203 can also be done automatically.

Figure 5:
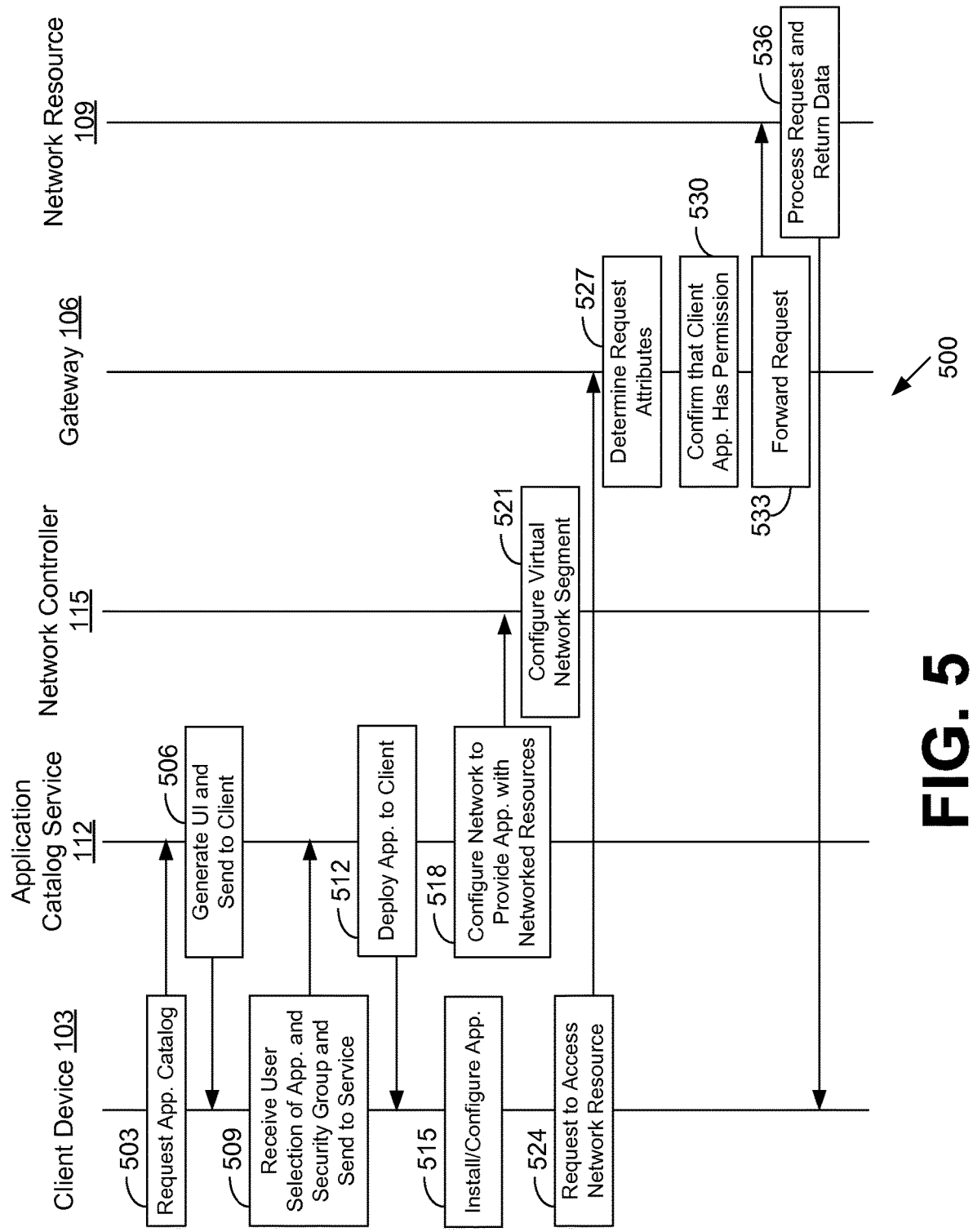
FIG. 5 is a sequence diagram illustrating an example component interaction according to various examples of the present disclosure.

Turning now to FIG. 5, shown is a sequence diagram 500 illustrating one example of interaction between a client device 103, an application catalog service 112, a network controller 115, a gateway 106, and a network resource 109. Functionality attributed to each of the client device 103, the application catalog service 112, the network controller 115, the gateway 106, and the network resource 109 can be implemented in fewer processes or application or in additional processes or applications. The separation or segmentation of functionality as discussed herein is presented for illustrative purposes only.

Beginning with step 503, an application executed on the client device 103 (e.g., the management application 133) requests data relating to an application catalog from the application catalog service 112. For example, a user can launch an application interface on the client device 103 corresponding to the application catalog. The request can be sent over the external network 121 to the application catalog service 112. At step 506, the application catalog service 112 generates a user interface 139 corresponding to the application catalog in response to the request. The application catalog service 112 then sends data encoding the user interface 139 to the client device 103. The client device 103 can then render the user interface 139 upon the display 130. The user interface 139 includes a listing of client applications 136 that are available to be deployed to the client device 103 under management by the management application 133 and the device management service 104.

At step 509, the client device 103 receives a user selection of a particular client application 136 from the application catalog, along with a user selection of a particular security group. In one example, a single selection can indicate both the particular client application 136 and the particular security group. Alternatively, the user can separately select the particular client application 136 and the particular security group. In selecting the particular security group, the user can indicate his or her role within the organization, which can be mapped to the security group. The selections of the particular client application 136 and the particular security group are sent to the application catalog service 112.

At step 512, the application catalog service 112 can deploy the selected client application 136 to the client device 103. To this end, a package containing the code implementing the selected client application 136 can be downloaded to the client device 103. At step 515, the client device 103 installs and/or configures the client application 136.

At step 518, the application catalog service 112 can cause the internal network 118 to be configured to provide the client application 136 deployed to the client device 103 with access to a particular set of network resources 109 corresponding to the indicated security group. For example, the gateway 106 can be configured to translate an application identifier or a combination of identifiers (e.g., user identifier, device identifier) into a particular virtual local area network or a particular internet protocol (IP) address that will be granted access to IP addresses and/or port addresses corresponding to the particular set of network resources 109. In this regard, the application catalog service 112 can cause the network controller 115 to configure a virtual network segment 203, at step 521, corresponding to the security group and set of network resources 109 to enable communication between the client application 136 deployed on the client device 103 and the set of network resources 109. This can involve configuration of routing tables, firewall rules, or other settings of the gateway 106 or other network elements of the internal network 118. For example, the network controller 115 can add a routing entry to the internal network 118 that would enable a given IP address (e.g., 10.200.1.21) that will correspond to the client application 136 to communicate with one or more other IP addresses (e.g., 10.50.1.3, 10.25.1.10) or subnet ranges (e.g., 10.25.1.x) that correspond to the set of network resources 109. In other words, the routers, switches, firewalls, and other network devices in the internal network 118 are thus configured to allow network traffic between these IP addresses to be forwarded and not dropped.

At step 524, the client application 136 that has been deployed to the client device 103 requests to access a network resource 109. A communication tunnel can be established between the client application 136 and the gateway 106 over the external network 121, thereby providing an encrypted virtual private network (VPN) tunnel for the client application 136 over the external network 121.

At step 527, the gateway 106 determines attributes associated with the request. These attributes can include, for example, IP address, port number, device identifier, application identifier, and device location (e.g., global positioning system (GPS) coordinates). At step 530, the gateway 106 confirms that the client application 136 has permission to access the requested network resource 109. This determination can be made with reference to one or more of the attributes determined at step 527. For example, a combination of a device identifier and an application identifier can be used to confirm a user's security group and associated permission to access a network resource 109 that is restricted to members of that security group. Rules data can be made available to the gateway 106 by way of the network controller 115 to enable this determination. If the client application 136 does not have permission, the request can be dropped.

Assuming that the client application 136 has permission, the gateway 106 forwards the request by way of a virtual network segment 203 of the internal network 118 to the network resource 109 at step 533. At step 536, the network resource 109 processes the request and returns data back to the client device 103 over the virtual network segment 203, the internal network 118 and a tunnel through the gateway 106 and the external network 121.

Figure 6:
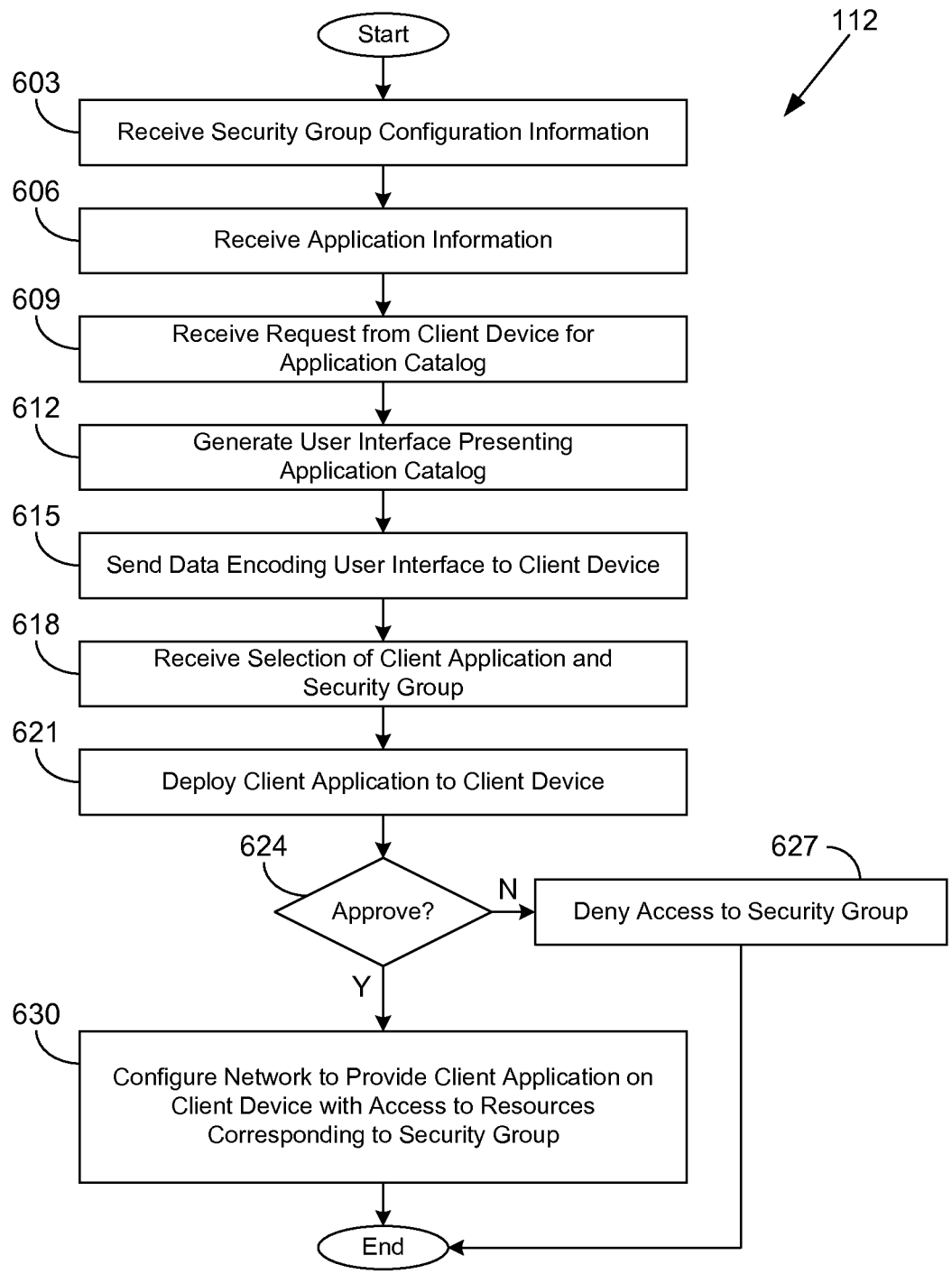
FIGS. 6 and 7 are flowcharts illustrating examples of functionality according to various examples of the present disclosure.

Turning now to FIG. 6, shown is a flowchart that provides one example of the operation of an application catalog service 112. Functionality attributed to the application catalog service 112 can be implemented in a single process or application or in multiple processes or applications. The separation or segmentation of functionality as discussed herein is presented for illustrative purposes only.

Beginning with step 603, the application catalog service 112 receives security group configuration information from an administrative user. This configuration information, which can be stored in the application catalog data store 127, can define a mapping of security groups that are available for particular client applications 136 through the application catalog. Further, the configuration information can map user roles within the organization to security groups. As used herein, a security group corresponds to a set of network resources 109. At step 606, the application catalog service 112 receives information regarding client applications 136 that are to be offered from an administrative user.

At step 609, the application catalog service 112 receives a request from a client device 103 for at least a portion of the application catalog. At step 612, the application catalog service 112 generates a user interface 139 that presents the application catalog. At step 615, the application catalog service 112 sends data encoding the application catalog to the client device 103. For example, the data can comprise HTML, XML, images, and other data.

At step 618, the application catalog service 112 receives a user selection of a particular client application 136 and a particular security group from the client device 103. At 621, the application catalog service 112 deploys the client application 136 to the client device 103. In some cases, the client application 136 can be previously deployed to the client device 103. At step 624, the application catalog service 112 determines whether to approve the client application 136 and the client device 103 for the requested security group. In some examples, all requests can be approved but with requests being logged for auditing purposes. In other examples, requests can be manually approved or automatically approved based upon job titles, defined roles in the organization, defined permissions, or other factors. Information about the requestor's role in the organization is obtained through a lightweight directory access protocol (LDAP) server in one example. For example, the application catalog service 112 can verify that a user associated with the client device 103 is authorized for the particular security group before configuring the internal network 118.

If the request is not to be approved, the application catalog service 112 moves to step 627 and denies access to the security group. Thereafter, the process can proceed to completion. If the request is to be approved, the application catalog service 112 continues from step 624 to step 630 and initiates configuration of the internal network 118 to provide the client application 136 on the client device 103 with access to a set of network resources 109 corresponding to the security group. This can involve configuration of the network controller 115 and the gateway 106 to establish a microsegment on the internal network 118 to provide access only to the set of network resources 109 and not other network resources 109. For example, the gateway 106 can be configured to assign an IP address of "10.30.1.20" to the client application 136, and the network controller 115 can configure the routers, switches, firewalls, or other devices of the internal network 118 only to allow traffic between "10.30.1.20" and the subnet of "10.45.x.x," while all communication from the "10.30.1.20" IP address to other IP addresses of the internal network 118 will be dropped. This configuration can permit routing of network traffic from the client application 136 to a virtual network segment 203 of the internal network 118 through which the particular set of network resources 109 are accessible. Thereafter, the process can proceed to completion.

Figure 7:
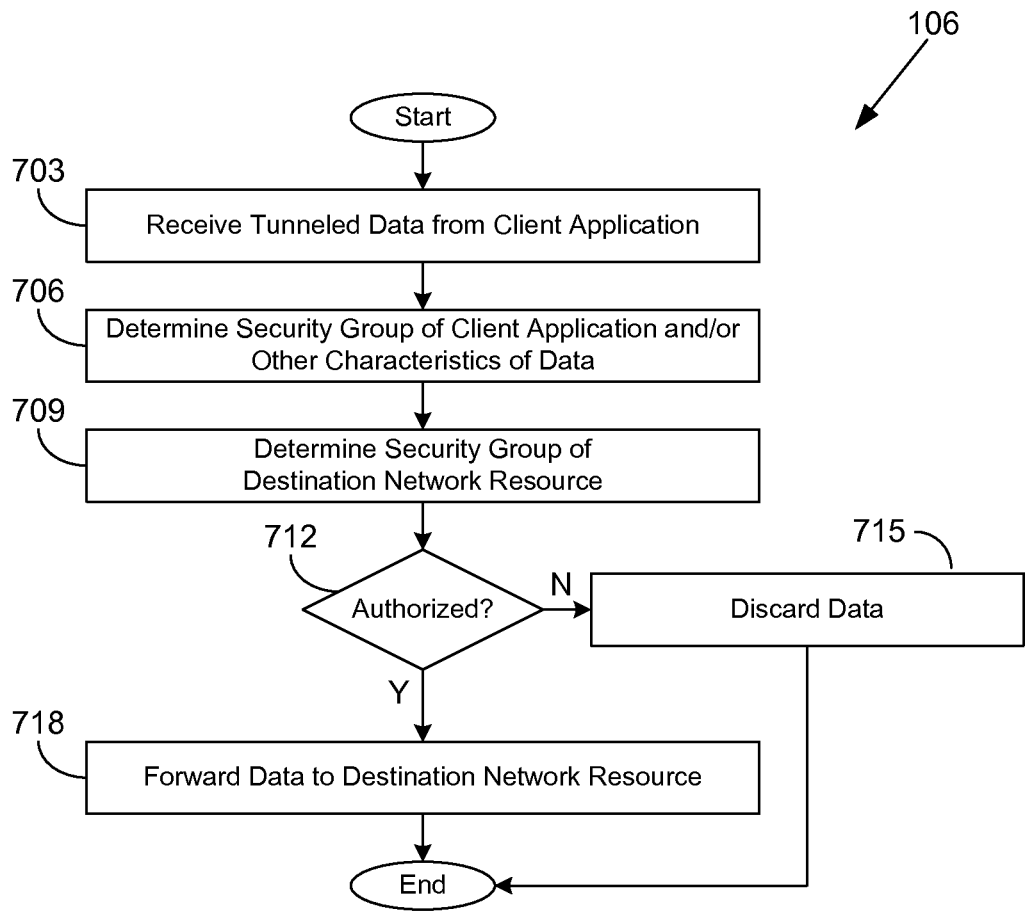

Continuing to FIG. 7, shown is a flowchart that provides one example of the operation of a gateway 106. Functionality attributed to the gateway 106 can be implemented in a single process or application or in multiple processes or applications. The separation or segmentation of functionality as discussed herein is presented for illustrative purposes only.

Beginning with step 703, the gateway 106 receives tunneled data from a client application 136 executed by a client device 103. The gateway 106 can decrypt the tunneled data using one or more keys as appropriate. At step 706, the gateway 106 determines the security group associated with the client application 136 and/or other characteristics of the data. These characteristics can include user identifier, application identifier, location, device identifier, source IP address, destination IP address, source port number, and destination port number. At step 709, the gateway 106 determines a security group or a virtual network segment 203 associated with the destination network resource 109.

At step 712, the gateway 106 determines whether the tunneled data is authorized to be forwarded to the virtual network segment 203 and the destination network resource 109. If the tunneled data is not authorized, the gateway 106 discards the data at step 715. Thereafter, the process can proceed to completion. For example, if a client application 136 authorized to access accounting group resources attempts to access supplier communication group resources, the request can be denied. Alternatively, if the tunneled data is authorized, at step 718, the gateway 106 forwards the data over the virtual network segment 203 to the destination network resource 109. Thereafter, the process can proceed to completion. The gateway 106 can check the attributes for each packet of data, or the determination of authorization can be cached for a given flow identifier (e.g., a combination of source and destination IP addresses and port numbers).

The flowcharts of FIGS. 6-7 and the sequence diagram of FIG. 5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the gateway 106, the network controller 115, the network resources 109, the application catalog service 112, the device management service 104, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client device 103, the gateway 106, the network controller 115, the network resources 109, the application catalog service 112, the device management service 104, and/or other components can be stored in one or more storage devices and be executable by one or more processors. Also, a data store can be stored in the one or more storage devices.

The client device 103, the gateway 106, the network controller 115, the network resources 109, the application catalog service 112, the device management service 104, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying at least one program executable in at least one computing device, the at least one program, when executed by the at least one computing device, being configured to cause the at least one computing device to at least:
   generate a user interface presenting an application catalog that includes a listing of a plurality of applications that are available to managed client devices in an organization;
   receive, from a managed client device operated by an end user, a selection of a particular application of the plurality of applications from the application catalog, the selection indicating a particular security group of a plurality of security groups;
   install the particular application on the managed client device in response to the selection; and
   configure a network of the organization to provide the particular application on the managed client device with access to a virtual segment of the network having access to a set of resources corresponding to the particular security group.

2. The non-transitory computer-readable medium of claim 1, wherein the particular security group is associated with a role of the end user within the organization, and the managed client device is used by the end user.

3. The non-transitory computer-readable medium of claim 1, wherein configuring the network of the organization further comprises configuring a network device to permit routing of network traffic from the particular application executed in the managed client device to the virtual segment of the network through which the set of resources are accessible.

4. The non-transitory computer-readable medium of claim 1, wherein each of the plurality of security groups are associated with a different virtual segment of the network.

5. The non-transitory computer-readable medium of claim 1, wherein another security group of the plurality of security groups corresponds to a different set of resources, and the different set of resources includes at least one resource in common with the set of resources corresponding to the particular security group.

6. The non-transitory computer-readable medium of claim 1, wherein the listing of the plurality of applications included in the application catalog comprises a plurality of instances of the particular application, individual ones of the plurality of instances corresponding respective ones of the plurality of security groups.

7. The non-transitory computer-readable medium of claim 1, wherein the user interface includes a component corresponding to the particular application that facilitates a user selection of the particular security group of the plurality of security groups.

8. The non-transitory computer-readable medium of claim 1, wherein the at least one program, when executed by the at least one computing device, is further configured to cause the at least one computing device to at least:
verify that the end user associated with the managed client device is authorized for the particular security group before configuring the network.

9. The non-transitory computer-readable medium of claim 1, wherein the at least one program, when executed by the at least one computing device, is further configured to cause the at least one computing device to at least:
send data encoding the user interface to the managed client device.

10. A system, comprising:
at least one computing device; and
an application catalog service executable by the at least one computing device, the application catalog service configured to cause the at least one computing device to at least:
generate a user interface presenting an application catalog that includes a listing of a plurality of applications that are available to managed client devices in an organization;
receive, from a managed client device associated with an end user, a selection of a particular application of the plurality of applications from the application catalog, the selection indicating a role of the end user in the organization;
install the particular application on the managed client device in response to the selection; and
configure a network of the organization to provide the particular application on the managed client device with access to a virtual segment of the network having access to a set of resources corresponding to the role of the end user in the organization.

11. The system of claim 10, wherein the role of the end user in the organization is associated with a particular security group of a plurality of security groups, and the set of resources corresponds to the particular security group.

12. The system of claim 10, wherein the user interface includes, for the particular application, a plurality of selectable components that correspond to a plurality of roles in the organization.

13. The system of claim 10, wherein configuring the network further comprises configuring a network device to permit routing of network traffic from the particular application executed in the managed client device to the virtual segment of the network through which the set of resources are accessible.

14. The system of claim 13, wherein the network device is configured to verify that the managed client device has a credential associated with the virtual segment of the network before routing the network traffic from the particular application to the virtual segment of the network.

15. The system of claim 10, wherein the application catalog service is further configured to cause the at least one computing device to at least:
receive a specification of a plurality of sets of resources for the particular application from an administrative user; and
generate a respective virtual segment on the network for each set of resources of the plurality of sets of resources.

16. A method, comprising:
generating a user interface presenting an application catalog that includes a listing of a plurality of applications that are available to client devices;
receiving, from a client device operated by an end user, a selection of a particular application of the plurality of applications from the application catalog, the selection indicating a particular security group of a plurality of security groups;
installing the particular application on the client device in response to the selection; and
configuring a network to provide the particular application on the client device with access to a virtual segment of the network having access to a set of resources corresponding to the particular security group.

17. The method of claim 16, wherein each security group of the plurality of security groups is associated with a respective selectable component for the particular application in the user interface.

18. The method of claim 16, further comprising:
receiving a specification of a plurality of sets of resources for the particular application from another client device associated with an administrative user; and
generating a respective virtual segment on the network for each set of resources of the plurality of sets of resources.

19. The method of claim 16, further comprising:
storing, in a data store, a record that the client device has requested access for the particular application to the set of resources corresponding to the particular security group.

20. The method of claim 16, further comprising:
sending the particular application to the client device in response to the selection.

* * * * *